United States Patent
Weksler et al.

(10) Patent No.: US 11,477,043 B2
(45) Date of Patent: Oct. 18, 2022

(54) METHOD AND DEVICE TO MANAGE BROWSER INSTANCES BASED ON LINK CATEGORIZATION

(71) Applicant: Lenovo (Singapore) Pte. Ltd., New Tech Park (SG)

(72) Inventors: Arnold S. Weksler, Raleigh, NC (US); John Carl Mese, Cary, NC (US); Nathan J. Peterson, Oxford, NC (US); Mark Patrick Delaney, Raleigh, NC (US); Russell Speight VanBlon, Raleigh, NC (US)

(73) Assignee: LENOVO (SINGAPORE) PTE. LTD., New Tech Park (SG)

( * ) Notice: Subject to any disclaimer, the term of this patent is extended or adjusted under 35 U.S.C. 154(b) by 6 days.

(21) Appl. No.: 17/204,027

(22) Filed: Mar. 17, 2021

(65) Prior Publication Data
US 2022/0303147 A1  Sep. 22, 2022

(51) Int. Cl.
| | |
|---|---|
| G06F 15/16 | (2006.01) |
| H04L 12/18 | (2006.01) |
| G06F 9/451 | (2018.01) |
| G06F 16/958 | (2019.01) |
| G06F 16/955 | (2019.01) |

(52) U.S. Cl.
CPC .......... *H04L 12/1822* (2013.01); *G06F 9/451* (2018.02); *G06F 16/958* (2019.01); *G06F 16/9558* (2019.01); *H04L 12/1818* (2013.01)

(58) Field of Classification Search
None
See application file for complete search history.

(56) References Cited

U.S. PATENT DOCUMENTS

| | | | | |
|---|---|---|---|---|
| 6,546,554 | B1* | 4/2003 | Schmidt | G06F 9/44526 709/201 |
| 2007/0192872 | A1* | 8/2007 | Rhoads | H04N 1/32144 726/26 |
| 2007/0276928 | A1* | 11/2007 | Rhoads | H04N 1/32144 709/219 |
| 2008/0014917 | A1* | 1/2008 | Rhoads | G06Q 30/06 455/422.1 |
| 2012/0324568 | A1* | 12/2012 | Wyatt | G06F 21/51 726/13 |

(Continued)

*Primary Examiner* — Phuoc H Nguyen
(74) *Attorney, Agent, or Firm* — The Small Patent Law Group LLC; Dean D. Small

(57) ABSTRACT

A method, device and computer program product are provided that receive a selection of a link to a destination resource at the computing device. The link is compared to a categorization library. The categorization library includes browser instance guidelines regarding accessing a web page associated with the link. Based on the comparing, the web page, associated with the destination resource, is launched in accordance with one of the browser instance guidelines that include: i) launching the web page as an appendage to a first browser instance that is already active when the link is in a first category, ii) launching the web page in a second browser instance separate from the first browser instance when the link is in a second category, and iii) launching the web page in a third browser instance utilizing a non-default browser type when the link is in a third category.

17 Claims, 4 Drawing Sheets

(56) References Cited

U.S. PATENT DOCUMENTS

| | | | |
|---|---|---|---|
| 2013/0332277 A1* | 12/2013 | Faith | G06Q 30/02 |
| | | | 705/14.54 |
| 2014/0229898 A1* | 8/2014 | Terwedo | G06F 3/04842 |
| | | | 715/835 |
| 2016/0179312 A1* | 6/2016 | Lam | G06F 3/04842 |
| | | | 715/738 |
| 2016/0357363 A1* | 12/2016 | Decker | G06F 16/9577 |
| 2017/0300214 A1* | 10/2017 | Roundtree | H04L 67/06 |
| 2018/0032997 A1* | 2/2018 | Gordon | G06Q 30/0269 |

* cited by examiner

METHOD AND DEVICE TO MANAGE BROWSER INSTANCES BASED ON LINK CATEGORIZATION

BACKGROUND

Embodiments herein generally relate to methods and devices for managing browser instances based on link categorization.

It is common place today for a user to navigate to a webpage by selecting or "clicking on" a link in a document, email, text message, meeting invite and the like. In response to the selection, the computing device opens a browser instance utilizing a browser that already exist on the computing device. When a default browser type is already launched and a link is selected, then a new webpage is appended to the active browser instance and the link is invoked. If the default browser is not already active/launched, then a new browser instance is launched and the link is invoked as a webpage within the new browser instance of the default browser type. There is very little control provided to the user to allow the user to decide when to launch a new browser instance or to use a browser type other than the default browser when a browser instance of the default browser type is already launched. This creates many usability issues if the user uses different browsers for different purposes.

While systems today allow the user to choose a particular browser type based on a URL, the existing solutions require the user to configure each URL separately. For example, the default browser may be set to Chrome, but an Edge browser is already launched, and the user may wish to join a meeting using a product like Skype or Team. When the user selects the meeting link, a webpage supporting the meeting will launch in a new Chrome browser instance so that the user can join the meeting. Later, the user may choose to join another meeting. As the Chrome browser instance is already active, a new tab (associated with the new webpage) will be created for the second meeting. Subsequent meetings are added as additional tabs to the single Chrome browser instance. At the end of the day, the user can simply close the Chrome instance to flush all of the meeting tabs.

However, in some cases, the user may launch a Chrome browser instance at the beginning of the day before any meetings and start to perform non-meeting related work utilizing the Chrome browser instance. As meetings are opened as additional webpages, meeting tabs would be appended to the Chrome browser instance. At the end of the day, the user would need to be careful not to terminate the entire Chrome browser instance as doing so would also delete the first tab containing the initial non-meeting related work.

Today browser extensions and applications exist that allow the user to manipulate the tabs and even some extensions that allow the user to recover a webpage tab if it is accidently deleted. However, there does not exist a way to decide when to launch a new instance of a browser based on usage. It can be very frustrating when using a browser of one type like Chrome, Edge, Firefox, or Internet Explorer and when clicking on a link from an email, the system launches a new instance of the default system browser.

A need remains to provide a better user experience in connection with managing activation of browser instances and webpages.

SUMMARY

In accordance with embodiments herein, a method is provided. The method comprises, under control of one or more processors executing program instructions for; defining a default browser type for a computing device; receiving a selection of a link to a destination resource at the computing device; comparing the link to a categorization library, the categorization library including browser instance guidelines regarding accessing a web page associated with the link; and based on the comparing, launching the web page associated with the destination resource in accordance with one of the browser instance guidelines: i) launching the web page as an appendage to a first browser instance that is already active when the link is in a first category, ii) launching the web page in a second browser instance separate from the first browser instance when the link is in a second category, and iii) launching the web page in a third browser instance utilizing a non-default browser type when the link is in a third category.

Additionally or alternatively, the method further comprises, in connection with second category, maintaining the first and second browser instances separate from one another and operating the first and second browser instances in parallel. Additionally or alternatively, the categorization library groups a collection of links based on at least one of a link function or historical usage. Additionally or alternatively, the link represents a meeting link to join a work-related meeting, and wherein the second category represents a dedicated meeting browser instance to launch and maintain a meeting-related web page separate from non-meeting related browser instances. Additionally or alternatively, the method further comprises closing the second browser instance without deleting session data related to the first browser instance. Additionally or alternatively, the method further comprises providing a second browser type different from the default browser type, the browser instance guidelines define the first default browser type to be utilized to open the new web page when associated with work related destination resources and the second default browser type to be utilized to open the new web page when associated with non-work related destination resources. Additionally or alternatively, the method further comprises receiving a selection to close the first browser instance, the first browser instance having multiple web pages open as corresponding separate tabs, identifying a sub-set of the multiple web pages that relate to a first topic, presenting an inquiry to close the sub-set of the web pages while maintaining a remainder of the web pages open.

In accordance with embodiments herein, a computing device is provided. The computing device comprises memory to store program instructions, the memory includes a system settings defining a default browser type, and one or more processors. The one or more processors included program instructions to: receive a selection of a link to a destination resource at the computing device; compare the link to a categorization library, the categorization library including browser instance guidelines regarding accessing a web page associated with the link; and based on the comparison, launch the web page associated with the destination resource in accordance with one of the browser instance guidelines: i) launch the web page as an appendage to a first browser instance that is already active when the link is in a first category, ii) launch the web page in a second browser instance separate from the first browser instance when the link is in a second category, and iii) launch the web page in a third browser instance utilizing a non-default browser type when the link is in a third category.

Additionally or alternatively, the one or more processors are further configured to maintain, in connection with second category, the first and second browser instances separate from one another and operate the first and second browser instances in parallel. Additionally or alternatively, the categorization library groups a collection of links based on at least one of a link function or historical usage. Additionally or alternatively, the link represents a meeting link to join a work-related meeting, and wherein the second category represents a dedicated meeting browser instance to launch and maintain a meeting-related web page separate from non-meeting related browser instances. Additionally or alternatively, the one or more processors are further configured to close the second browser instance without deleting session data related to the first browser instance. Additionally or alternatively, the memory is configured to store a second browser type different from the default browser type, the browser instance guidelines define the first default browser type to be utilized to open the new web page when associated with work related destination resources and the second default browser type to be utilized to open the new web page when associated with non-work related destination resources. Additionally or alternatively, the one or more processors are further configured to: receive a selection to close the first browser instance, the first browser instance having multiple web pages open as corresponding separate tabs; identify a sub-set of the multiple web pages that relate to a first category; and present an inquiry to close the sub-set of the web pages while maintaining a remainder of the web pages open.

In accordance with embodiments herein, a computer program product is provided that comprises a non-signal computer readable storage medium comprising computer executable code to: define a default browser type for a computing device; receive a selection of a link to a destination resource at the computing device; compare the link to a categorization library, the categorization library including browser instance guidelines regarding accessing a web page associated with the link; and based on the comparison, launch the web page associated with the destination resource in accordance with one of the browser instance guidelines: i) launch the web page as an appendage to a first browser instance that is already active when the link is in a first category, ii) launch the web page in a second browser instance separate from the first browser instance when the link is in a second category, and iii) launch the web page in a third browser instance utilizing a non-default browser type when the link is in a third category.

Additionally or alternatively, the executable code is configured to maintain, in connection with second category, maintaining the first and second browser instances separate from one another and operating the first and second browser instances in parallel. Additionally or alternatively, the categorization library groups a collection of links based on at least one of a link function or historical usage. Additionally or alternatively, the link represents a meeting link to join a work-related meeting, and wherein the second category represents a dedicated meeting browser instance to launch and maintain a meeting-related web page separate from non-meeting related browser instances. Additionally or alternatively, the executable code is further configured to close the second browser instance without deleting session data related to the first browser instance. Additionally or alternatively, the categorization library includes at least two of the following categories: i) business related search, ii) personal related search, iii) audio/video meeting support and document sharing tool, iv) document generation and management tool, v) social media, vi) video sharing website, or vii) streaming service, viii) separate users work, ix) financial resources, and x) travel resources.

DETAILED DESCRIPTION

Figure 1:
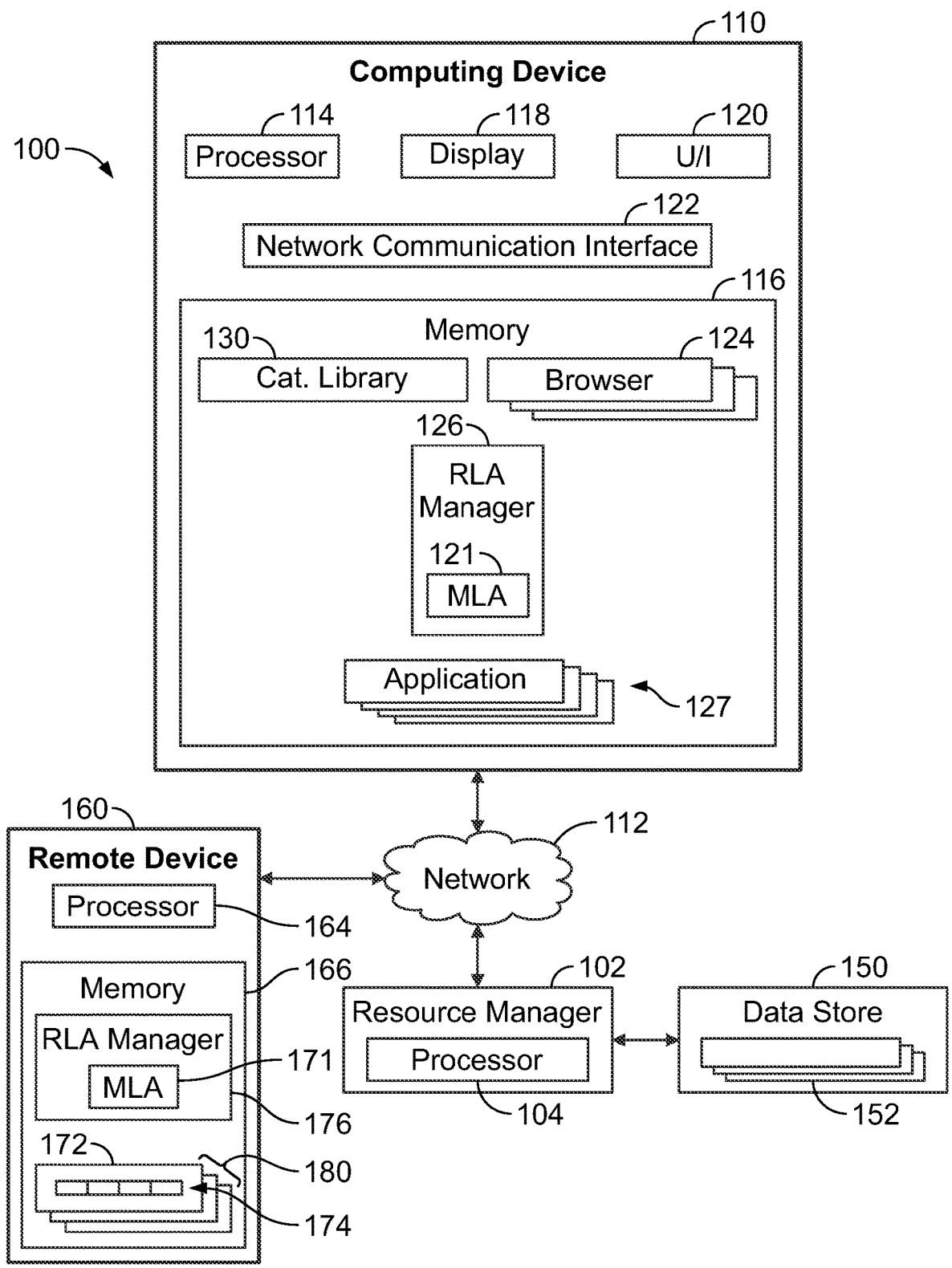
FIG. 1 illustrates a system implemented in accordance with embodiments herein to automatically manage activation of browser instances based on network resource link categorization.

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, and/or the like. In other instances, well-known structures, materials, or operations are not shown or described in detail to avoid obfuscation. The following description is intended only by way of example and simply illustrates certain example embodiments.

It should be clearly understood that the various arrangements and processes broadly described and illustrated with respect to the Figures, and/or one or more individual components or elements of such arrangements and/or one or more process operations associated of such processes, can be employed independently from or together with one or more other components, elements and/or process operations described and illustrated herein. Accordingly, while various arrangements and processes are broadly contemplated, described and illustrated herein, it should be understood that they are provided merely in illustrative and non-restrictive fashion, and furthermore can be regarded as but mere examples of possible working environments in which one or more arrangements or processes may function or operate.

Embodiments herein provide methods and systems that allow resource links to be categorized in various manners such as based on domain, path, keywords, resource function, usage history and the like. For example, links may be categorized based on function, such as differentiating between a document creation/management function, meeting related function, work-related function, personal-related function, school related function. The links may be categorized based content functions, such as when a network resource offers video, text, social media, streaming services and the like. The methods and systems utilize the categorization of links to decide whether to launch a webpage in an already active browser, in a new browser, utilizing a default browser type, utilizing a non-default browser type, and the like.

FIG. 1 illustrates a system implemented in accordance with embodiments herein to automatically manage activation of browser instances based on network resource link categorization. The system 100 includes one or more resource managers 102 that manage and otherwise provide access to one or more data stores 150 that store network resources 152. The resource managers 102 communicate with one or more computing devices 110 through one or more networks 112, to provide access to the applications (network resources 152). The networks 112 may represent the World Wide Web, a local area network, a wide area network, and/or the like. The computing devices 110 may represent various types of electronic devices (e.g., digital personal assistant, virtual assistant, intelligent digital assistant, client device, and/or the like) including, but not limited to, a smartphone, a cell phone, a laptop, a computer, a tablet device, and/or the like. Optionally, the system 100 includes one or more remote devices 160 that build and maintain a categorization library. Optionally, the computing devices 110 may build and maintain the categorization library instead of or in addition to the categorization library maintained by the remote device 160.

The resource manager 102 may represent a server or other network-based computing environment. The resource manager 102 may represent a single computer system or a collection of computer systems located at a common location or geographically distributed. The resource manager 102 includes one or more processors 104 and memory 116, among other structures that support the operation of the resource manager 102. Optionally, the resource manager 102 may be included on the computing device 110. The data store 150 may store the network resources 152 organized in various manners and related to a wide variety of topics and content. As non-limiting examples, collections of network resources 152 may be organized and maintained in connection with websites, web pages, blogs, social media, and/or the like.

The computing device 110 includes one or more processors 114, memory 116, a display 118, a user interface 120 and a network communications interface 122. The display 118 and user interface 120 collect information from and present information to the user in connection with various operations and applications implemented by the computing device 110. The network communications interface 122 facilitates communication through the network 112 with the resource manager 102.

The memory 116 stores various data, programs, applications and the like. The memory 116 stores multiple types of browsers 124, for which one or more instance may be active at any given point in time. In connection with embodiments herein, the memory 116 stores a resource link awareness (RLA) manager 126 that implements operations as described herein. Optionally, the memory 116 may further store a machine learning algorithm (MLA) 121 that may be implemented by the RLA manager 126 to perform operations as described herein. The memory 116 further stores a categorization library 130 that includes browser instance guidelines that indicate when and how to launch a browser instance and a web page associated with a link.

Figure 2:
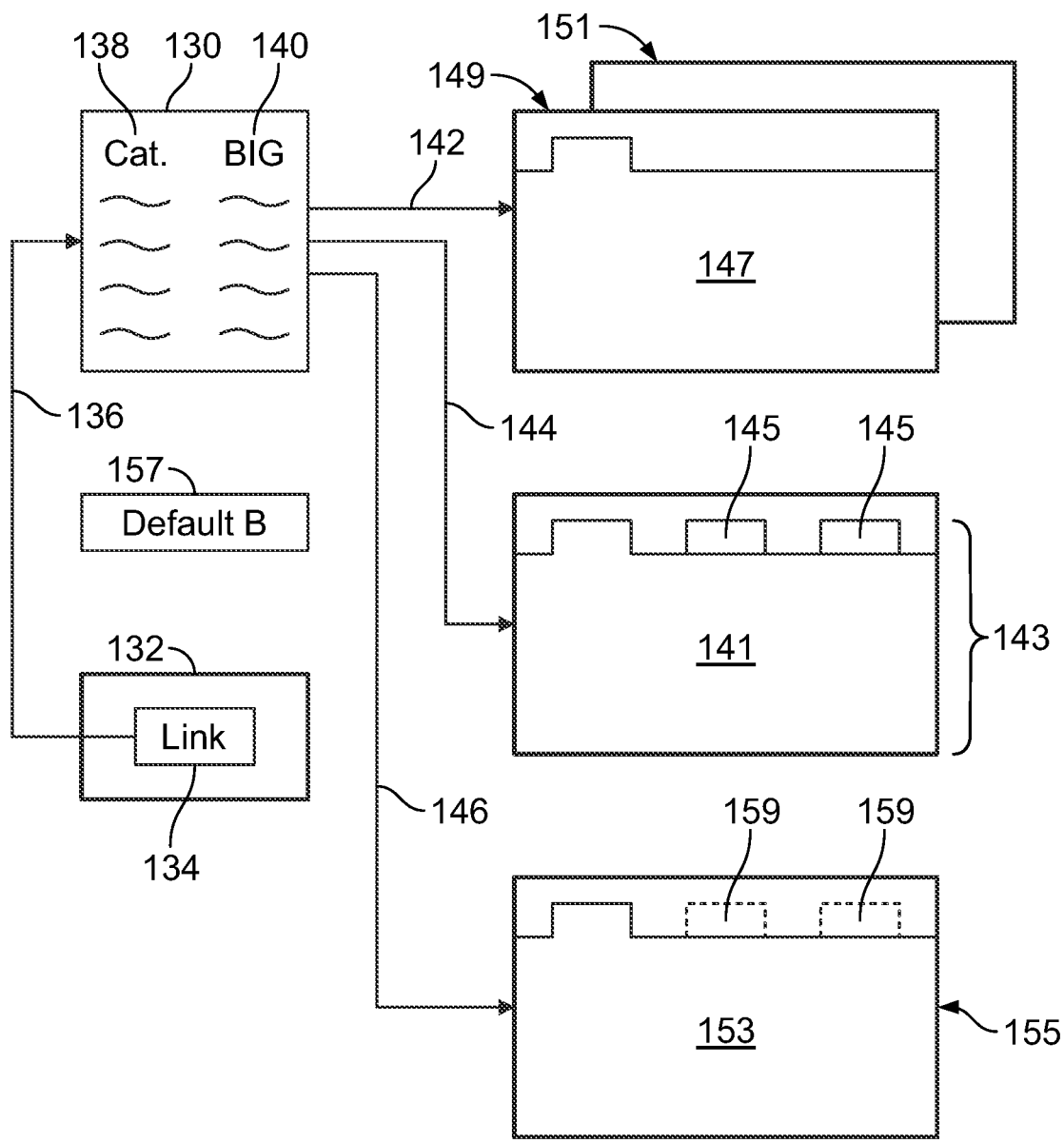
FIG. 2 illustrates a graphical representation of example implementations of browser instance guidelines.

FIG. 2 illustrates a graphical representation of example implementations of browser instance guidelines. FIG. 2 illustrates a window 132 that may be presented on a display of the computing device in connection with an application being utilized by the user. The window 132 includes a link 134 to a network resource. Nonlimiting examples of applications that may be associated with the window 130 to include electronic mail, text messaging, calendar events, and document generation and management applications (e.g., Word, PowerPoint, Excel, Adobe). As another example, the window 130 may correspond to a browser instance, such as when a user conducts an Internet search. The link 134 may correspond to a result found within the search. As another example, the window 132 may correspond to a window presented during an AV meeting (e.g., during a teams meeting), where the link 134 is connected to a document to be shared during the meeting.

When the link 134 selected, the computing device accesses the categorization library 134 as denoted at 136. With reference to FIG. 1, the RLA manager 126 compares a resource link to a list of categories in the categorization library 130 and based on the comparing, the RLA manager 126 identifies a category associated with the resource link. The RLA manager 126 launches the new web page associated with the destination resource in accordance with one of the browser instance guidelines corresponding to the category associated with the resource link.

As shown in FIG. 2, the categorization library 130 includes a list of categories 138 and corresponding browser instance guidelines 140. Depending upon which of the categories 138 that match the link 134, the computing device follows the corresponding the browser instance guidelines 142, 144, 146. As explained herein, different or common browser instances are launched based on corresponding link category. For example, the categorization library 130 may include a browser instance guideline 144 (e.g., rules or other setting) to direct one or more processors to launch the web page 141 in a first browser instance 143 that is already active when the link is in a first category. When the first browser instance 143 is already active, the first browser instance 143 may include one or more preceding active webpages 145. When the link 134 corresponds to a second category, the browser instance guideline 142 may direct the one or more processors to launch the web page 147 in a second browser instance 149 separate from another (first) browser instance 151. When the link 134 corresponds to a third category, the browser instance guideline 146 may direct the one or more processors to launch the web page 153 in a third browser instance 155 utilizing a non-default browser type (e.g., such as the default browser type stored in the settings of the computing device at 157). In connection with a third category, when a browser instance 155 of the nondefault type is already open, a new webpage 153 may be opened therein and appended to existing webpages 159. Alternatively, when the nondefault browser type is not already active, the browser instance 155 may represent launch of a new browser.

As explained herein, the RLA manager 126 may be configured to build and update the categorization library 130. For example, the RLA manager 126 may monitor selections of network resource links, by a user. The RLA manager 126 may categorize each resource link based on the type or context of the resource. Examples of types or contexts of network resources include network resources for i) business related searches, ii) personal related searches, iii)

audio/video meeting support and document sharing tools (e.g., Webex, Team Meetings, Zoom, Skype), iv) document generation and management tools (e.g., Word, PowerPoint, Excel, Adobe), v) social media (Facebook, Instagram, Twitter), vi) video sharing websites (e.g., YouTube), vii) streaming services (e.g., television networks, FuboTV, Hulu, Amazon Prime, HBO Max), viii) separate users work (e.g., to keep children's schoolwork separate from parents business work), ix) financial resources (e.g., a bank website, a retirement account website), x) travel resources (e.g., airline websites, hotel websites, car rental websites) and the like. The foregoing types of network resources may be classified as separate resource categories. The RLA manager 126 may automatically categorize a network resource and/or prompt the user to categorize the network resource. For example, the RLA manager 126 may "watch" the user behavior and ask the user if the user wants to open a separate browser instance for a newly selected link or whether the user desires to open the new webpage in an active browser instance. The user's response is saved and utilized to build the categorization library and guidelines. Once categorized, the RLA manager 126 may store information or data related to the network resource in the categorization library 130. For example, the categorization library 130 may store lists of domains, base URLs, URL paths, key words/terms in a URL path and the like. Each list may be associated with a different type or context of network resource. Each list may correspond to a category. The domains, base URLs, URL paths, keywords/terms and the like may be utilized, when a link is selected for a destination resource, to determine which category from the browser instance guidelines should be utilized when determining how and when to launch a corresponding webpage.

As another example, separate categories may be maintained in connection with different users (also referred to as user specific categories). For example, when a child is utilizing a computing device to perform homework, the webpages and browser instances opened in connection with the child's session may be maintained separately as one or more categories (e.g., a schoolwork category, math category, English category, science category).

The RLA manager 126 may further monitor a user's behavior, such as to ascertain which type of browser the user utilizes to access certain types or contexts of network resources. For example, the user may choose one type of web browser when performing business related searches, and another type of web browser when performing personal searches. As another example, the user may always open a new browser instance in connection with audio/video meeting support and document sharing tools. As another example, the user may maintain a separate browser instance for document generation and management tools, separate and distinct from any other browser instances for meeting support tools. As yet a further example, a user may always choose one type of browser for social media or streaming services, even though the chosen type of browser is not the default browser for the computing device. Based on the users usage history, the RLA manager 126 may build and continue to supplement the categorization library 130 to continuously improve the specificity of the browser instance guidelines and tailor the browser instance guidelines to a user's individual behavior.

During standard day-to-day operation, the user may utilize the computing device 110 for various tasks, including selection of links to networks resources. Links may be accessed/selected in a variety of manners through a variety of types of applications 127. Nonlimiting examples of applications 127 may include electronic mail management, text messaging, a calendar, audio/video meeting support and document sharing, document generation and management tools, social media, video sharing websites, streaming services and the like.

Among the tasks, a user may open a browser instance to review and edit various types of documents (e.g., Word, PowerPoint, Excel, Adobe documents) utilizing a first browser instance (also referred to as a document management browser instance). During the course of a business day, the user may have one or more AV meetings. To access a meeting, a user may open a calendar item, such as in Outlook or another schedule management tool, and select a link saved in the calendar item for the scheduled meeting. When the link is selected, the computing device 110 initiates a webpage associated with the AV meeting. As another example, the user may open an email, text message or other communication that includes a link, such as a social media link (e.g., Facebook, Insta Graham, Twitter), a video sharing link (e.g., YouTube), a streaming service link (e.g., FuboTV, Hulu) and the like. Additionally or alternatively, the link may be accessed/selected through an application operating on the computing device 110 (e.g., by opening a FuboTV application, YouTube application, Facebook application). The foregoing represent nonlimiting examples of how a link may be selected at the computing device 110.

The RLA manager 126 receives the selection of the link to the destination resource. The RLA manager 126 compares the link to a collection of categories maintained in the categorization library 130 to determine whether the link is associated with an existing category. When the link corresponds to an existing category, the RLA manager 126 identifies a corresponding browser instance guideline and accesses a webpage associated with the link in accordance with the corresponding browser instance guideline.

The RLA manager 126 may execute one or more machine learning algorithms (MLA) 121 stored in the memory 116 to build and update the categorization library 130. The processors 114 may execute a decision tree, K-means, deep learning, artificial neural network, and/or the like. To build and update the categorization library 130, the MLA 121 monitors operations performed by the computing device 110 periodically, over an extended period of time, during a learning mode or otherwise. The RLA manager 126, utilizing the MLA 121, monitors and tracks user actions in connection with opening, accessing and closing resources (e.g., web pages, application windows) during operation of the computing device 110.

The remote device 160 may represent a server or other network-based computing environment. The remote device 160 may represent a single computer system or a collection of computer systems located at a common location or geographically distributed. The remote device 160 includes one or more processors 164, memory 166, a display, a user interface and a network communications interface. The display and user interface collects information from and present information to the user in connection with various operations and applications implemented by the remote device 160. The network communications interface facilitates communication through the network 112 with the resource manager 102 and numerous computing devices 110.

The memory 166 stores various data, programs, applications and the like. In connection with embodiments herein, the memory 166 stores an RLA manager 176 that implements operations as described herein. The memory 166 further stores an MLA 171 implemented by the RLA manager 176 to perform operations as described herein. The memory 166 further stores an categorization library 180 that maintains link categories 172 associated with browser instance guidelines as described herein to support content transfer in connection with resource context awareness. By way of example, a link category 172 may include a record 174 of a series of links, full or partial URLs, keywords and the like in connection with a category of destination resources. The category 172 may include and define one or more of the context of the destination resources, one or more characteristics of interest for the destination resource, as well as additional or alternative information.

The remote device 160 collects information concerning link categories and user management of browser instances performed by a large population of computing devices 110. The remote device 160 analyzes the link categories and user management of browser instances to identify browser instance guidelines that may be recommended to computing devices 110. In accordance with an embodiment, the computing devices 110 may maintain records of contexts for network resources accessed by the computing devices 110, characteristics of interest for content segments copied from network resources, and characteristics of interest for data entry fields in the network resources. The computing devices 110 convey, to the remote device 160, the contexts for the network resources, characteristics of interest and data entry fields. The remote device 160 generates browser instance guidelines based on the records. Optionally, the computing devices 110 may perform all or a portion of the operations described herein.

As explained herein, the RLA manager 176 builds and updates categories 172 within the categorization library 180. The RLA manager 176 processes the records, from computing devices 110, that track link selections and browser management actions, identify resource contexts of interest, track resources, determine a correlations and build categories and browser instance guidelines based on the correlation and store the browser instance guidelines in the categorization library 180.

Figure 3:
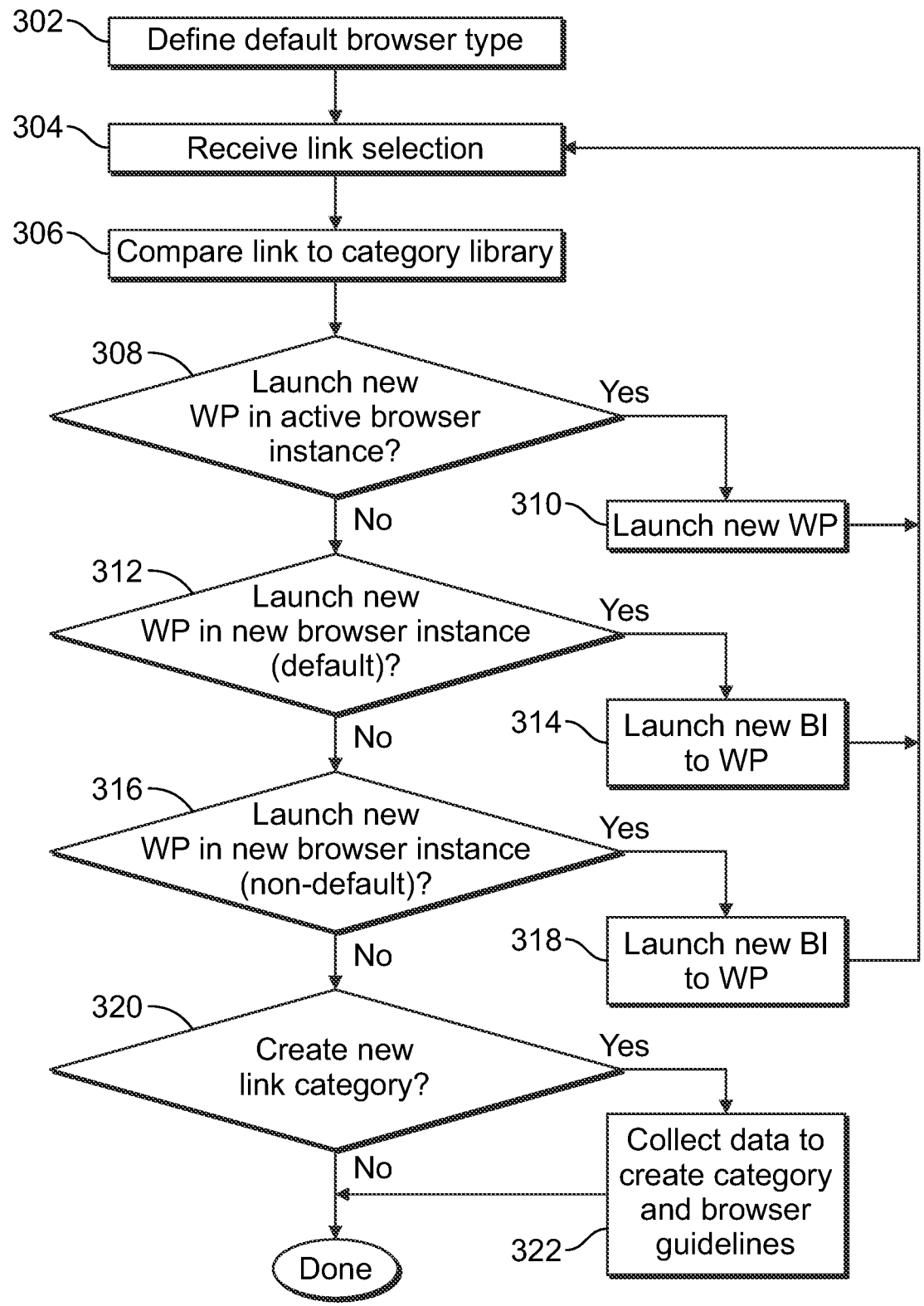
FIG. 3 illustrates a method for managing activation of web pages and browser instances in accordance with embodiments herein.

FIG. 3 illustrates a method for managing activation of web pages and browser instances in accordance with embodiments herein. The operations of FIG. 3 are implemented under control of one or more processors executing program instructions. The operations of FIG. 3 may be implemented by one or more computing devices 110, one or more remote devices 160, or a combination thereof.

At 302, one or more processors determine and/or define a default browser type that is utilized by a computing device. For example, the computing device may save, in system settings, a designation of a default browser type. At 304, the one or more processors receive a selection of a link to a destination resource at the computing device. The selection may be obtained in various manners. For example, an email, text message or calendar notice may be opened and a link within the email or calendar notice may be selected. As another example, a document or work file may be opened, such as a Word, PowerPoint, Excel, Adobe document. The document may include a link to a network resource. As another example, a search network resource may be open (e.g., the Google search tool), the results of a search may be presented, and the user may select one of the search results.

At 306, the one or more processors compare the link to a categorization library. The categorization library includes browser instance guidelines that indicate when and how to launch a web page associated with the link in connection with various browser instance options. At 308, the one or more processors determine whether the link is associated with a first category, and if so, flow passes to 310. Otherwise, flow moves to 312.

At 310, the one or more processors launch the web page in a first browser instance that is already active. The first category may be referred to as an active browser instance. For example, the first category may correspond to a basic or default category in which no unique action is necessary when opening a new webpage. Instead, it may be desirable to open the new webpage in an existing active browser instance.

Additionally or alternatively, the browser instance guidelines may direct the computing device to limit or minimize system resources. For example, if a browser instance is running then, regardless of the system settings, the computing device may utilize the browser instance that is active and currently running for any new webpages to be opened from link selections. As an example, the computing device may be running an Edge browser instance, but the system settings define the Chrome browser to be the default browser type. If a link is selected, the computing device would launch a new web page in the Edge browser instance that was currently running.

At 312, the one or more processors determine whether the link is associated with a second category, and if so, flow passes to 314. Otherwise, flow moves to 316. For example, the second category may refer to a one-to-one or link-to-browser category. The second category may correspond to network resources that are assigned or otherwise designated by the user to always warrant the activation of a new browser instance to present the corresponding webpage.

For example, browser instance guidelines may categorize links, associated with Team meetings, such that each time a Team meeting is initiated from a link, the Team meeting is opened in a separate browser instance. Additionally or alternatively, all web pages associated with Team meetings may be opened in a single common browser instance, but with the single common browser instance not used for any other link besides Team meetings. For example, a user may be performing work using a first instance of a Chrome browser and decides to join a Team meeting. When the Team meeting link is selected, the computing device launches a new instance of the Chrome browser for the meeting (separate from the Chrome browser instance utilized to perform work). If the user selects another link, later in the day, to join another meeting, the computing device will create a new tab in the Chrome browser instance that was utilized for the first meeting (still separate from the Chrome browser instance utilized to perform work). At the end of the day, the user can close the Chrome browser instance, associated with the meetings, without interfering with the Chrome browser instance associated with the work product and not worry about deleting anything else.

As another example, the browser instance guidelines may direct the computing device to use one type of browser for one type of searches (e.g., personal searches), and to use another type of browser for another type of searches (e.g., work related searches). This would allow for multiple tabs (webpages) but with different browser instances based on use. At 314, the one or more processors launch the web page in the second browser instance separate from the first browser instance.

At 316, the one or more processors determine whether the link is associated with a third category, and if so, flow passes to 318. Otherwise, flow moves to 320. For example, the third category may correspond to network resources that are assigned or otherwise designated by the user to warrant the activation of a particular type of browser instance that does not correspond to the default browser instance.

The third category may be referred to as a non-default browser specific category. For example, the browser instance guidelines may define link categories associated with certain types of network resources. For example, one type of network resource may be YouTube links, while another type of network resource may be the Workday cloud system. The browser instance guidelines may indicate that all links associated with one type of network resource (e.g., YouTube) should be launched as webpages in a first type of browser (e.g., Chrome), while all links associated with a second type of network resource (e.g., Workday) should be launched as webpages in a second type of browser (e.g., Edge). The type of browser designed in the browser instance guidelines will be used regardless of what default browser has been selected in the system settings of the computing device. At 318, the one or more processors launch the web page in a third browser instance utilizing a non-default browser type.

In accordance with the foregoing operations at 306 to 318, based on the comparison of a selected link with the information in the categorization library, the one or more processors launch each new web page associated with a destination resource in accordance with a corresponding browser instance guideline.

When the link does not match any existing browser instance guideline, flow moves from 316 to 320. At 320, the one or more processors may determine whether a new link category should be created. If so, flow moves to 322. Otherwise, the process is completed until the next link selection is received. At 322, the one or more processors collect data sufficient to create a new link/resource category and assign at least one corresponding browser instance guideline.

Additionally or alternatively, the browser instance guidelines may allow the user to categorize tabs (webpages) based on use and allow specified tabs to be closed when closing the browser, while other tabs are maintained open. For example, a message may pop up asking if the user wants financial tabs to be close only or tabs that relate to a particular domain to be closed. Alternatively, the computing device may afford the user the option to decide which tabs to remain open as opposed to closed when shutting down the browser.

Figure 4:
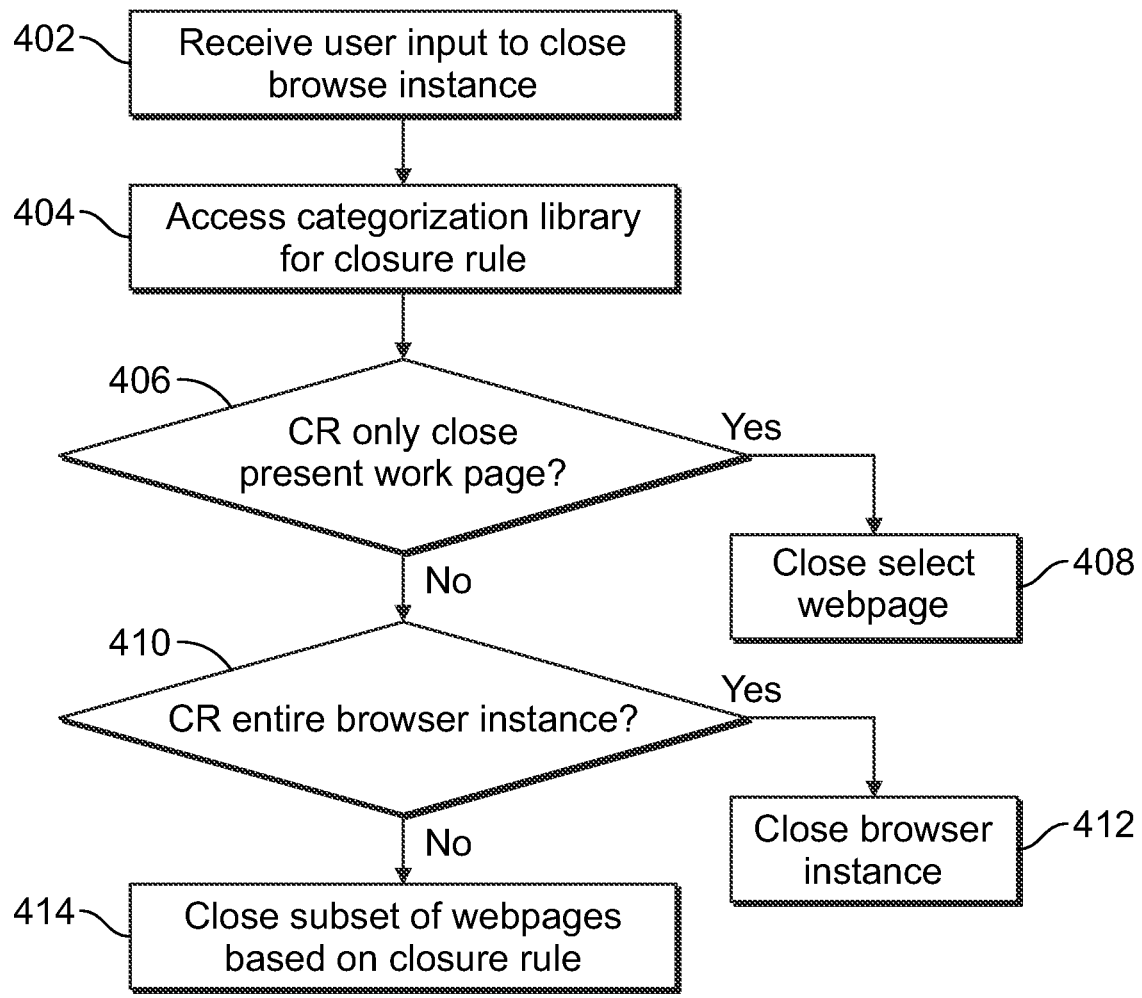
FIG. 4 illustrates a method for managing closure of browser instances and web pages in accordance with embodiments herein.

FIG. 4 illustrates a method for managing closure of browser instances and web pages in accordance with embodiments herein. The operations of FIG. 4 are implemented under control of one or more processors executing program instructions. The operations of FIG. 4 may be implemented by one or more computing devices 110, one or more remote devices 160, or a combination thereof.

At 402, the one or more processors receive a user input to close a browser instance. At 404, the one or more processors access the categorization library foreclosure rules in connection with the corresponding browser instance guidelines. At 406, the one or more processors determine whether the closure rule indicates to only closed the present webpage. If so, flow moves to 408 and the chosen/select webpage is closed. When the select webpage is closed at 408, the computing device maintains session data related to other webpages open in the present browser instance. Only session data related to the closed webpage is deleted. When the closure rule does not correspond to an individual webpage, flow moves from 406 to 410. At 410, the one or more processors determine whether the closure rule indicates to close an entire browser instance. If so, flow moves to 412, where the browser instance and all webpages associated with the browser instance are closed.

When the closure rule does not correspond to closing all webpages in a browser instance, flow moves to 414. At 414, the one or more processors determine the subset of the webpages to be closed in accordance with the closure rule. For example, the closure rule may be based on the webpage designated by the user to be closed. For example, a user may enter an instruction to close a webpage associated with a meeting. The closure rule may indicate that all webpages associated with a meeting category are to be closed, while all other webpages remain open, even when such non-meeting related webpages are in the same browser instance. As another example, a user input may designate a webpage, related to a document creation/management application, to be closed. The closure rule may indicate that all webpages, having a similar document creation/management type are to be closed while all other webpages remain open, even when such other webpages are in the same browser instance. As another example, a user input may designate a webpage, related to a child's homework, to be closed. The closure rule may indicate that all webpages related to the same type of homework should be closed, while all other webpages remain open.

Additionally or alternatively, in accordance with the operations of FIG. 4, the one or more processors receive a selection to close the first browser instance. In some instances, the first browser instance will have multiple web pages open as corresponding separate tabs. The one or more processors identify a sub-set of the multiple web pages that relate to a first category or topic; and present an inquiry to close the sub-set of the web pages while maintaining a remainder of the web pages open.

It is recognized that a variety of categories may be designated. Examples of categories of network resources include i) business related searches, ii) personal related searches, iii) audio/video meeting support and document sharing tools, iv) document generation and management tools, v) social media, vi) video sharing websites, vii) streaming services, viii) separate users work, ix) financial resources (e.g., a bank website, a retirement account website), travel resources (e.g., airline websites, hotel websites, car rental websites) and the like.

Optionally, the user may be prompted with an option to close the subset of webpages designated in accordance with the closure rule. Based on the users input, one or more webpages may then be closed, while one or more other webpages remain open (in the same browser instance). Optionally, the closure rules may apply to individual browser instances, or extend a crossed multiple browser instances. For example, when a user closes a meeting related webpage in a first browser instance, other meeting related webpages may exist in separate browser instances. The closure rule may indicate that the meeting related webpages in the other browser instances are also to be closed.

In accordance with the embodiments described herein, new and distinct aspects are provided that allow resource links to be categorized in various manners such as based on domain, path, keywords, resource function, usage history and the like. For example, links may be categorized based on function, such as differentiating between a document creation/management function, meeting related function, work-related function, personal-related function, school related function. The links may be categorized based content functions, such as when a network resource offers video, text, social media, streaming services and the like. The methods and systems utilize the categorization of links to decide whether to launch a webpage in an already active browser, in a new browser, utilizing a default browser type, utilizing a non-default browser type, and the like.

CLOSING STATEMENTS

As will be appreciated by one skilled in the art, various aspects may be embodied as a system, method or computer (device) program product. Accordingly, aspects may take the form of an entirely hardware embodiment or an embodiment including hardware and software that may all generally be referred to herein as a "circuit," "module" or "system." Furthermore, aspects may take the form of a computer (device) program product embodied in one or more computer (device) readable storage medium(s) having computer (device) readable program code embodied thereon.

Any combination of one or more non-signal computer (device) readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a dynamic random access memory (DRAM), a read-only memory (ROM), an erasable programmable read-only memory (EPROM or Flash memory), a portable compact disc read-only memory (CD-ROM), an optical storage device, a magnetic storage device, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of network, including a local area network (LAN) or a wide area network (WAN), or the connection may be made through other devices (for example, through the Internet using an Internet Service Provider) or through a hard wire connection, such as over a USB connection. For example, a server having a first processor, a network interface, and a storage device for storing code may store the program code for carrying out the operations and provide this code through its network interface via a network to a second device having a second processor for execution of the code on the second device.

Aspects are described herein with reference to the figures, which illustrate example methods, devices and program products according to various example embodiments. These program instructions may be provided to a processor of a general purpose computer, special purpose computer, or other programmable data processing device or information handling device to produce a machine, such that the instructions, which execute via a processor of the device implement the functions/acts specified. The program instructions may also be stored in a device readable medium that can direct a device to function in a particular manner, such that the instructions stored in the device readable medium produce an article of manufacture including instructions which implement the function/act specified. The instructions may also be loaded onto a device to cause a series of operational steps to be performed on the device to produce a device implemented process such that the instructions which execute on the device provide processes for implementing the functions/acts specified.

The units/modules/applications herein may include any processor-based or microprocessor-based system including systems using microcontrollers, reduced instruction set computers (RISC), application specific integrated circuits (ASICs), field-programmable gate arrays (FPGAs), logic circuits, and any other circuit or processor capable of executing the functions described herein. Additionally or alternatively, the units/modules/controllers herein may represent circuit modules that may be implemented as hardware with associated instructions (for example, software stored on a tangible and non-transitory computer readable storage medium, such as a computer hard drive, ROM, RAM, or the like) that perform the operations described herein. The above examples are exemplary only, and are thus not intended to limit in any way the definition and/or meaning of the term "controller." The units/modules/applications herein may execute a set of instructions that are stored in one or more storage elements, in order to process data. The storage elements may also store data or other information as desired or needed. The storage element may be in the form of an information source or a physical memory element within the modules/controllers herein. The set of instructions may include various commands that instruct the units/modules/applications herein to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software also may include modular programming in the form of object-oriented programming. The processing of input data by the processing machine may be in response to user commands, or in response to results of previous processing, or in response to a request made by another processing machine.

It is to be understood that the subject matter described herein is not limited in its application to the details of construction and the arrangement of components set forth in the description herein or illustrated in the drawings hereof. The subject matter described herein is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Further, in the following claims, the phrases "at least A or B", "A and/or B", and "one or more of A and B" (where "A" and "B" represent claim elements), are used to encompass i) A, ii) B and/or iii) both A and B.

It is to be understood that the above description is intended to be illustrative, and not restrictive. For example, the above-described embodiments (and/or aspects thereof) may be used in combination with each other. In addition, many modifications may be made to adapt a particular situation or material to the teachings herein without departing from its scope. While the dimensions, types of materials and coatings described herein are intended to define various parameters, they are by no means limiting and are illustrative in nature. Many other embodiments will be apparent to those of skill in the art upon reviewing the above description. The scope of the embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects or order of execution on their acts.

What is claimed is:

1. A method, comprising:
under control of one or more processors executing program instructions for;
defining a default browser type for a computing device;
receiving a selection of a link to a destination resource at the computing device;
comparing the link to categories in a categorization library, the categorization library correlating the categories of links and corresponding browser instance guidelines regarding launching a web page associated with the link; and
based on the comparing, launching the web page associated with the destination resource in accordance with one of the browser instance guidelines corresponding to the category that matches the link, the browser instance guidelines comprising:
  i) launching the web page as an appendage to a first browser instance that is already active when the link is in a first category, and
  ii) launching the web page in a second browser instance separate from the first browser instance when the link is in a second category,
wherein the link represents a meeting link to join a work-related meeting, and wherein the second category represents a dedicated meeting browser instance to launch and maintain a meeting-related web page separate from non-meeting related browser instances.

2. The method of claim 1, the method further comprising, in connection with the second category, maintaining the first and second browser instances separate from one another and operating the first and second browser instances in parallel.

3. The method of claim 1, wherein the categorization library groups a collection of links into at least one of the first and second category, based on at least one of a link function or historical usage.

4. The method of claim 1, further comprising closing the second browser instance without deleting session data related to the first browser instance.

5. The method of claim 1, further comprising providing a second browser type different from the default browser type, the browser instance guidelines defining the first default browser type to be utilized to open the new web page when associated with work related destination resources and the second default browser type to be utilized to open the new web page when associated with non-work related destination resources.

6. The method of claim 1, further comprising receiving a selection to close the first browser instance, the first browser instance having multiple web pages open as corresponding separate tabs, identifying a sub-set of the multiple web pages that relate to a first topic, presenting an inquiry to close the sub-set of the web pages while maintaining a remainder of the web pages open.

7. A computing device, comprising:
memory to store program instructions, the memory includes a system settings defining a default browser type;
under control of one or more processors included program instructions to:
receive a selection of a link to a destination resource at the computing device;
compare the link to categories in a categorization library, the categorization library correlating the categories and corresponding browser instance guidelines regarding launching a web page associated with the link; and
based on the comparison, launch the web page associated with the destination resource in accordance with one of the browser instance guidelines corresponding to the category that matches the link, the browser instance guidelines comprising to:
  i) launch the web page as an appendage to a first browser instance that is already active when the link is in a first category, and
  ii) launch the web page in a second browser instance separate from the first browser instance when the link is in a second category,
wherein the link represents a meeting link to join a work-related meeting, and wherein the second category represents a dedicated meeting browser instance to launch and maintain a meeting-related web page separate from non-meeting related browser instances.

8. The device of claim 7, the one or more processors are further configured to maintain, in connection with second category, the first and second browser instances separate from one another and operate the first and second browser instances in parallel.

9. The device of claim 7, wherein the categorization library groups a collection of links into at least one of the first and second category, based on at least one of a link function or historical usage.

10. The device of claim 7, wherein the one or more processors are further configured to close the second browser instance without deleting session data related to the first browser instance.

11. The device of claim 7, wherein the memory is configured to store a second browser type different from the default browser type, the browser instance guidelines define the first default browser type to be utilized to open the new web page when associated with work related destination resources and the second default browser type to be utilized to open the new web page when associated with non-work related destination resources.

12. The device of claim 7, wherein the one or more processors are further configured to:
receive a selection to close the first browser instance, the first browser instance having multiple web pages open as corresponding separate tabs;
identify a sub-set of the multiple web pages that relate to a first category; and
present an inquiry to close the sub-set of the web pages while maintaining a remainder of the web pages open.

13. A computer program product comprising a non-signal computer readable storage medium comprising computer executable code to:
define a default browser type for a computing device;
receive a selection of a link to a destination resource at the computing device;
compare the link to categories in a categorization library, the categorization library correlating the categories and corresponding browser instance guidelines regarding launching a web page associated with the link; and
based on the comparison, launch the web page associated with the destination resource in accordance with one of the browser instance guidelines corresponding to the category that matches the link, the browser instance guidelines comprising to:

i) launch the web page as an appendage to a first browser instance that is already active when the link is in a first category, and ii) launch the web page in a second browser instance separate from the first browser instance when the link is in a second category, wherein the link represents a meeting link to join a work-related meeting, and wherein the second category represents a dedicated meeting browser instance to launch and maintain a meeting-related web page separate from non-meeting related browser instances.

14. The computer program product of claim 13, the executable code to maintain, in connection with second category, maintaining the first and second browser instances separate from one another and operating the first and second browser instances in parallel.

15. The computer program product of claim 13, wherein the categorization library groups a collection of links into at least one of the first and second category, based on at least one of a link function or historical usage.

16. The computer program product of claim 13, the executable code to close the second browser instance without deleting session data related to the first browser instance.

17. The computer program product of claim 13, wherein the categorization library includes at least two of the following categories: i) business related search, ii) personal related search, iii) audio/video meeting support and document sharing tool, iv) document generation and management tool, v) social media, vi) video sharing website, or vii) streaming service, viii) separate users work, ix) financial resources, and x) travel resources.

\* \* \* \* \*